(12) United States Patent
Beebe

(10) Patent No.: US 6,966,028 B1
(45) Date of Patent: Nov. 15, 2005

(54) SYSTEM AND METHOD FOR A UNIFORM WEBSITE PLATFORM THAT CAN BE TARGETED TO INDIVIDUAL USERS AND ENVIRONMENTS

(75) Inventor: Charles Beebe, Laguna Beach, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 769 days.

(21) Appl. No.: 09/837,641

(22) Filed: Apr. 18, 2001

(51) Int. Cl.[7] .................. G06F 15/00; G06F 17/00; G06F 15/16
(52) U.S. Cl. .............. 715/517; 715/501.1; 715/508; 715/513; 715/500; 715/516; 709/217; 709/236
(58) Field of Search .................. 715/501.1, 508, 715/513, 517; 709/217, 236

(56) References Cited

U.S. PATENT DOCUMENTS

| 5,627,549 | A | | 5/1997 | Park ............................ 342/357 |
| 5,630,068 | A | | 5/1997 | Vela et al. ................... 395/201 |
| 5,835,087 | A | * | 11/1998 | Herz et al. ................... 715/810 |
| 6,047,327 | A | | 4/2000 | Tso et al. .................... 709/232 |
| 6,151,622 | A | | 11/2000 | Fraenkel et al. ............ 709/205 |
| 6,332,127 | B1 | * | 12/2001 | Bandera et al. ............... 705/14 |
| 6,430,624 | B1 | | 8/2002 | Jamtgaard et al. ........... 709/246 |
| 6,593,944 | B1 | * | 7/2003 | Nicolas et al. ............... 345/744 |
| 6,701,315 | B1 | * | 3/2004 | Austin ........................... 707/10 |
| 2001/0045965 | A1 | * | 11/2001 | Orbanes et al. ............. 345/841 |
| 2002/0007639 | A1 | * | 1/2002 | Saravanan | |
| 2002/0054126 | A1 | * | 5/2002 | Garnon | |
| 2002/0059244 | A1 | | 5/2002 | Bunney et al. ................ 707/10 |
| 2002/0104023 | A1 | * | 8/2002 | Hewett et al. ............... 713/201 |
| 2002/0123334 | A1 | * | 9/2002 | Borger et al. ................ 455/419 |
| 2002/0133540 | A1 | * | 9/2002 | Sears et al. .................. 709/203 |

* cited by examiner

*Primary Examiner*—Joseph Feild
*Assistant Examiner*—Chau Nguyen
(74) *Attorney, Agent, or Firm*—Stallman & Pollock LLP

(57) ABSTRACT

A system and method for a uniform website platform are provided. For a representative embodiment, a website is created so that one or more of its web pages are subdivided into a series of panels. Each panel is associated with a collection of inserts. Each insert can include any combination of the objects that are normally found on web pages, including content and applications. Users request pages from the website using their browser programs. The responding web server dynamically selects inserts for each of the panels included in each requested page. The selection process may be based on any number of different selection criteria including user preferences and the country or region associated with the web site. The web server renders the selected panels to create each requested page. The dynamically created pages are then returned to the requesting browser.

9 Claims, 2 Drawing Sheets

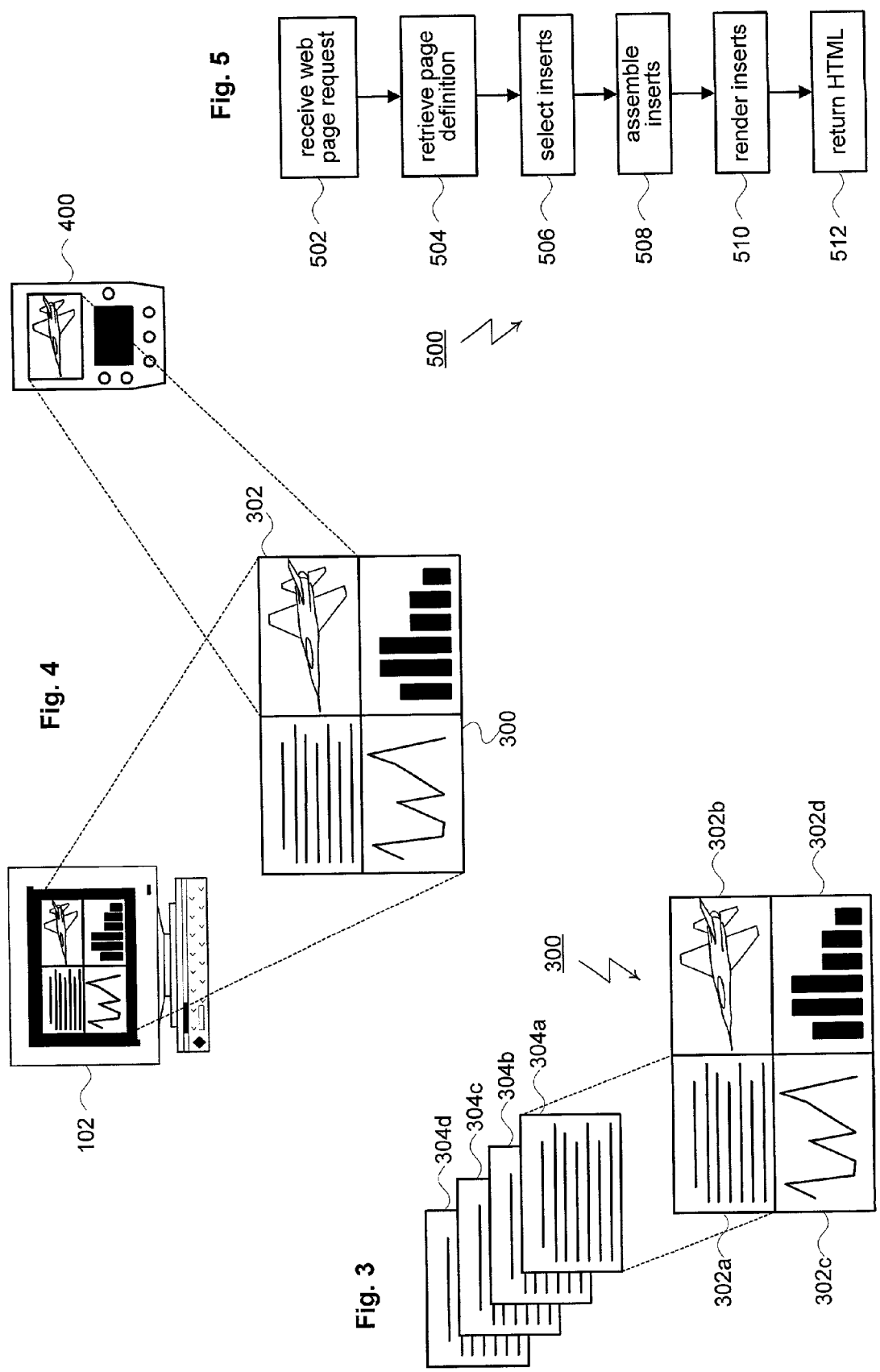

SYSTEM AND METHOD FOR A UNIFORM WEBSITE PLATFORM THAT CAN BE TARGETED TO INDIVIDUAL USERS AND ENVIRONMENTS

TECHNICAL FIELD OF THE INVENTION

The present invention relates generally to methods for building and maintaining websites. More particularly, the present invention includes a method for building website platforms that can be uniquely customized for individual users.

BACKGROUND OF THE INVENTION

Websites design, implementation and maintenance often involve great expense. This is attributable, in part, to the increasingly complex set of features that make up even relatively generic websites. These features include both content and software (active components). The design, implementation and maintenance of content and software are often complex, and often require specialized practitioners. The need to keep both software and content current adds considerably to the expense of maintaining websites. Unfortunately, this is often an absolute necessity in the fast changing environment of the Internet and World Wide Web.

The expenses associated with website deployment and operation are exacerbated in cases where a company or organization must maintain a series of different websites. This can happen, for example, in cases where an organization must maintain a web presence in different countries or regions. In many cases, this involves far more than simply providing different language versions of the same website. Examples where this is true include websites maintained by financial institutions. These websites are often tightly constrained by local regulations and laws. As a result, financial institutions are often forced to build and maintain completely separate websites for each country or region of use. This can greatly increase the expense of maintaining a web presence.

The expenses of website deployment and operation are attributable (at least in part) with the traditional methodologies used to construct websites. These same methodologies have a number of other undesirable results. One of these is the difficulty of tailoring websites to fit the needs and preferences of individual users. This problem is similar, in many ways, to the problem of deploying multiple websites to suit different regions. In the case of websites for individuals, however, the scale of the problem can be quite massive with many websites having thousands of different users.

For these and other reasons, a need exists for systems that allow websites to be quickly and inexpensively targeted to multiple users, uses and environments. This is particularly important in cases where an organization needs to maintain a web presence in multiple countries or regions.

SUMMARY OF THE INVENTION

An embodiment of the present invention provides a system and method for a uniform website platform that can be targeted to individual users and environments. For a representative embodiment, a website is created so that one or more of its web pages are subdivided into a series of panels. Each panel is associated with a collection of inserts. Each insert can include any combination of the objects that are normally found on web pages, including content and applications.

Users request pages from the website using their browser programs. The responding web server dynamically selects inserts for each of the panels included in each requested page. The selection process may be based on any number of different selection criteria including user preferences and the country or region associated with the web site. The web server renders the selected panels to create each requested page. The dynamically created pages are then returned to the requesting browser.

The use of panels filled by inserts provides a flexible method for constructing web pages. Different inserts can be used to adapt a single page to a wide range of different environments. This reduces costs when a page is retargeted to different environments and circumstances.

The use of panels filled by inserts may also be used to enhance the portability of web pages to non-traditional display environments such as personal data assistants (PDAs) and other hand held devices. To provide this type of portability, the panels of a web page are sized to fit within the display of a targeted hand held device. When viewed on a traditional display, the panels (i.e., the rendered inserts) combine to form an entire screen. In the hand held environment each panel is viewed as its own separate screen. This preserves look and feel across diverse environments.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which:

FIG. 3 is a block diagram of a web page defined using the web page definition method of the present invention.

FIG. 4 is a block diagram showing the web page of FIG. 3 being accessed by a computer system and a personal data assistant.

FIG. 5 is a flowchart showing the steps associated with the web page serving method of the present invention.

DETAILED DESCRIPTION OF THE PREFERRED EMBODIMENTS

The preferred embodiments of the present invention and their advantages are best understood by referring to FIGS. 3 through 5 of the drawings. Like numerals are used for like and corresponding parts of the various drawings.

Environment

Figure 1:
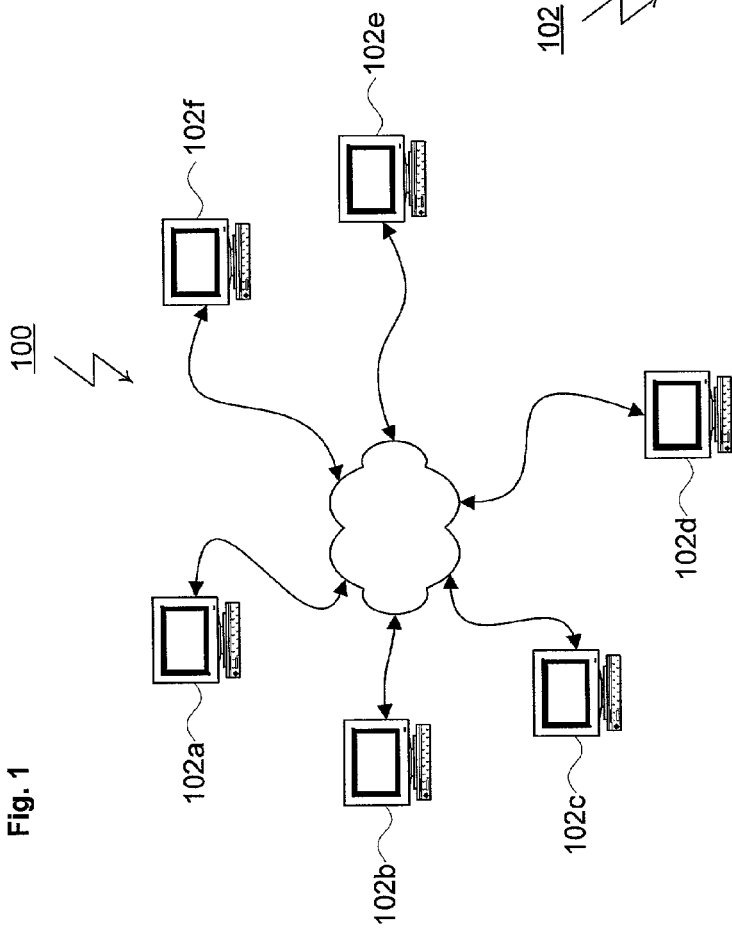
FIG. 1 is a block diagram of an Internet-like network shown as a representative environment for deployment of the present invention.

In FIG. 1, a computer network 100 is shown as a representative environment for an embodiment of the present invention. Computer network 100 is intended to be representative of the complete spectrum of computer network types including Internet and internet-like networks. Computer network 100 includes a number of computer systems, of which computer system 102*a* through 102*f* are representative. Computer systems 102 are intended to be representative of the wide range of large and small computer systems that are used in computer networks of all types. In FIG. 1, computer systems 102*a* through 102*d* are shown as desktop computer systems and computer systems 102e and 102f are shown as handheld computers or personal data assistants (PDAs). This mixture is intended to be representative in nature with the understanding that computer systems 102 may be any network compatible computing device.

Figure 2:
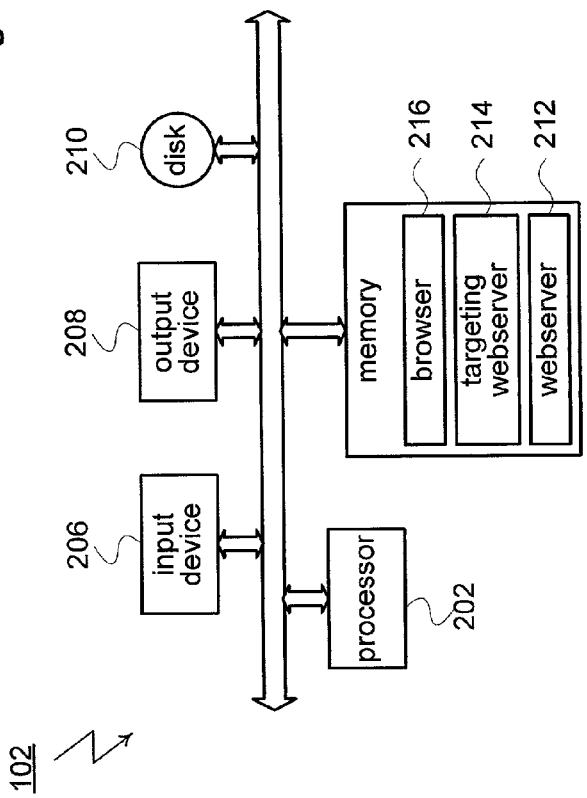
FIG. 2 is a block diagram of a computer system as used within the network of FIG. 1.

FIG. 2 shows a representative implementation for computer systems 102. Structurally, each computer system 102 includes a processor, or processors 202, and a memory 204. Processor 202 can be selected from a wide range of commercially available or custom types. An input device 206 and an output device 208 are connected to processor 202 and memory 204. Input device 206 and output device 208 represent all types of I/O devices such as disk drives, keyboards, modems, network adapters, printers and displays. Each computer system 102 may also includes a disk drive 210 of any suitable disk drive type (equivalently, disk drive 210 may be any non-volatile mass storage system such as "flash" memory).

For the purposes of this description, it may be assumed that one or more computers 102 are configured as web servers. Other computers 102 may be assumed to be web clients. Computers 102 that act as web clients include a web browser program 216. Web browser programs 216 request web pages from web server programs 212 using the hypertext transfer protocol (HTTP) or similar conveyance. Web server programs 212 receive these requests and, where appropriate return corresponding web pages.

Uniform Website Platform

An embodiment of the present invention provides a system and method for a uniform website platform that can be targeted to individual users and environments. To provide the uniform website platform, the present invention includes two separate methods: a web page definition method, and a web page serving method. The following sections describe each of these methods in turn.

Web Page Definition

FIG. 3 shows a web page 300 defined using the web page definition method of the present invention. As shown in FIG. 3, web page 300 is subdivided into a series of panels 302. Each panel 302 is a region or area of web page 300. The size, shape and number of panels 302 can be tailored to suit the needs of individual web pages 300. In some cases, panels 302 will be of uniform size and shape. In other cases, a mixture of different size or shaped panels 302 may be used within a single web page 300. In FIG. 3, panels 302 are shown as having visible boundaries. It should be appreciated that this is for purposes of illustration and is not required for the web page definition method.

Each panel 302 is associated with one or more inserts 304. This is shown explicitly for panel 302a with the understanding that other panels 302 have similar associations. Each insert 304 provides a different combination of content for its associated panel 304. The appearance and function of a panel 302 may be changed by choosing among its associated inserts 304.

The content included within inserts 304 may be selected to achieve a number of different ends. One of these ends is per-user customization. Per-user customization tailors the content of a web site to individual users. As an example, consider the case where a web site relates to an area that is factually complex. Web sites that relate to the stock market and other financial transactions often fall into this category. These web sites may have large amounts of factual data to present to their users. There are many cases, however where much of this data will be unnecessary or even undesirable. This is the case, for example, where a novice user accesses a web site of this type. To better support this type of user, it may be desirable to provide a website that includes far less detail in much simplified form. In fact, it is often desirable to support a range of different users from novice to intermediate to advanced with additional levels in-between. Inserts 304 may be configured to support this kind of per-user customization. In FIG. 3 panels 302c and 302d include inserts 304 depicting different graphs. To support individual users, a range of different inserts 304 could be defined, with varying levels of detail, for each of these panels 302.

To perform per-user customization, it is necessary to associate users with particular inserts 304. In some cases these associates may be explicit. This is the case where a user explicitly requests to be provided with an advanced or novice display of a stock ticker. In other cases, the associates may be inferred. This is the case where appropriate inserts 304 are selected based on the way that users interact with a web site (usage patterns). Associations may also be inferred based on other factors, such as demographic information supplied by users.

Region-specific customization is another end that may be addressed through the use of inserts 304. Region-specific customization allows a website to be targeted to specific countries or regions. This is often necessary, for example, where local laws either require or prohibit the inclusion of particular content. Region-specific customization also allows content to be tailored in ways that aren't necessarily required by law. This includes customization to match local languages, dialects and customs.

In some cases, the value of inserts 304 lies not so much in their ability to be customized as it does their ability to create brand/design continuity. Examples of this would include the use of corporate logos and insignias as inserts. Compared to other types of inserts 304, logos and insignias are less likely to change between different websites (assuming the websites are owned by the same company or organization). In these and similar cases, inserts 304 provide a convenient method for encapsulating content that remains relatively static. This can be used as a mechanism to produce a constant look and feel across a series of different websites.

Inserts 304 may also have public and secure variants. This allows non-authenticated users to be presented with a public version of an insert 304. A secure version of the same insert 304 could be substituted for authenticated users. This can be used to provide authenticated users with non-public information or even information that is private to them, such as account balance information.

In many cases, it will be desirable to choose the size of panels 302 and inserts 304 to increase the portability of web page 300. As shown in FIG. 4, this can be done by choosing the overall size of web page 300 to fit within the display of computer 102. At the same time, the size of panels 302 and inserts 304 is chosen to fit within the display of a target personal data assistant (PDA) or other hand held device 400. This allows the same web page 300 to be viewed on different devices. FIG. 4 provides an example showing two such devices computer system 102 and PDA 400. In the first case, web page 300 is viewed as is. In the second case, PDA 400 is used to navigate (scroll) between different parts of the web page 300. In either case, the look and feel of web page 300 is maintained.

Web Page Serving

Users request web pages using browser programs 216. Browser program forwards these requests to web server program 212. Typically, a page request will first be routed through a simple HTTP web server program 212, and then to a more specialized targeting web server 214 capable of handling personalized content (targeting). Requests for static content, such as plain HTML files, may be served directly from the HTTP server 212. In cases where targeting is employed, a requested web page will have been defined using the just described web page definition method. Targeting web server program 214 maintains an internal description for each of the web pages 300 of this type. The internal description (code) of each web page 300 includes details, such as the size, number and location of panels 302.

This may be done by creating web page 300 as a JSP page with a large table. The size of each table cell is defined to fit panels 302. Panels 302 are constructed as partial JSP pages. The partial JSP pages are then used to fill the table cells.

The internal description also includes methods (such as links or Java servlets) for locating the inserts 304 associated with each web page 300. Requests for assembling the content within inserts 304 are handled by targeting web server 214. Targeting web server 214 maintains this content in a database or other suitable storage location.

FIG. 5 shows a method 500 used by targeting web server program 214 to respond to requests for pages defined using the web page definition method. Method 500 begins at step 502 where targeting web server program 214 receives a request for a web page. The request includes some form of indicia (typically a URL) that identifies the particular web page 300 being requested.

In step 504, targeting web server program 214 uses the indicia included in the request to locate the definition of the requested web page. Typically, this means that targeting web server program 214 retrieves the appropriate definition from its internal database of web page definitions.

In step 506, targeting web server program 214 retrieves a profile for the user requesting the web page. In cases where no profile is found (e.g., where a new user is involved) web server program 212 creates a new profile. Web page server 212 may retrieve this profile from an internal database or from a separate database. In the later case, it is generally desirable to implement the database as a network database or in some other way that allows the database to be accessed by multiple instances of targeting web server program 214.

In step 508, targeting web server program 214 uses the web profile retrieved in the preceding step to assemble content for inserts 304, as required by the web page definition retrieved in step 504. Typically, targeting web page server 212 stores this content as part of a separate database. Based upon the users' profile and the business rules defining conditions for modification of the page, specific content is gathered from this database. In general, this selection process may be performed to achieve any of the ends previously described. For instance, inserts 304 may be selected to achieve per-user or region-specific customizations. Inserts 304 may also be selected to provide public content of secure content. In this way, targeting web server program 214 performs per-user customization of the web page definition.

In step 510, targeting web server program 214 renders the selected inserts 304 to create an HTML (or other presentation language such as XML) representation of the requested web page 300. Targeting web server program 214 completes method 500 at step 512 by returning the HTML (or other presentation language such as XML) representation.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A method for defining a web page, the method comprising the steps of:
   subdividing the web page into a plurality of panels, where each panel is a fixed portion of the web page, and is of a uniform size and a uniform shape, such that each of the panels are of the same size and shape which is suited for display on a targeted personal data assistant;
   defining one or more inserts for each panel, each insert renderable to produce code for the corresponding panel;
   wherein for a first panel of the plurality of panels at least two inserts are defined for the first panel, and a first insert of the at least two inserts for the first panel provides for display of secure content, and is displayed only where a user has been authenticated, and a second insert of the at least two inserts provides for display of non-secure content and is displayed instead of the first insert, when a user has not been authenticated;
   wherein for a second panel of the plurality of panels at least two inserts are defined for the second panel and a first insert of the at least two inserts for the second panel is displayed when a user is determined to be from a first geographic region, and the first insert includes content which is required by a first set of laws governing the first geographic region, and a second insert of the at least two inserts for the second panel is displayed when a user is determined to be from a second geographic region, and the second insert includes content which is required by a second set of laws governing the second geographic region, and
   wherein for a third panel of the plurality of panels at least two inserts are defined for the third panel, and a first insert of the at least two inserts for the third panels provides an advanced level of detailed information corresponding to a stock ticker symbol, and a second insert of the at least two inserts for the third panel provides a novice level of information for a stock ticker symbol, wherein a determination is made to display either the first insert or the second insert for the third panel, based on one factor selected from the following group of factors a user indicated preference as to whether the user wants advanced or novice level of information for the stock ticker symbol, and the user's previous usage pattern with a website.

2. A method as recited in claim 1, wherein each panel is sized so that a series of panels may be simultaneously viewed on a standard sized computer display.

3. A method as recited in claim 1, wherein at least some of the inserts are user-specific.

4. A method for responding to a request for a web page the method comprising the steps of:
   retrieving a profile corresponding to a user requesting the web page;
   retrieving a definition corresponding to the requested web page, the definition describing locations for a plurality of panels included in the web page, wherein each panel is of a uniform size and shape such that each of the panels are suited for display on a targeted personal data assistant;
   selecting from at least two inserts for a first panel for the web page based on the definition and the profile, wherein a first insert of the at least two inserts for the first panel provides an advanced level of detailed information corresponding to a stock ticker symbol, and a second insert of the at least two inserts for the first panel provides a novice level of information for a stock ticker symbol, wherein a determination is made to display either the first insert or the second insert for the first panel, based on one factor selected from the following group of factors a user indicated preference as to whether the user wants advanced or novice level of information for the stock ticker symbol, and the user's previous usage pattern with a website;

providing at least a first insert and second insert for a second panel of the web page, wherein the first insert for the second panel is selected if the user is from a first geographic region, and the first insert includes content which is required by a first set of laws governing the first geographic region, and wherein the second insert for the second panel is selected if the user from a second geographic region, and the second insert includes content which is required by second set of laws governing the second geographic region;

providing at least a first insert and a second insert for a third panel of the webpage, wherein the first insert for third panel includes secure data and is selected if the user has been authenticated, and the second insert for the third panel includes only non-secure data, and is selected if the user is not authenticated;

rendering the selected panels to produce code for the web page; and returning the code.

5. A method as recited in claim 4, wherein each panel is sized so that a series of panels may be simultaneously viewed on a standard sized computer display.

6. A method as recited in claim 4, wherein at least some of the inserts are user-specific.

7. A data storage medium having machine-readable code stored thereon, the machine-readable code comprising instructions executable by an array of logic elements, the instructions defining a method, comprising the steps of:

receiving a request for a web page;

retrieving a profile corresponding the user requesting the web page;

retrieving a definition corresponding to the requested web page, the definition describing locations for a plurality of panels which make up the the web page, wherein each panel of the plurality of panels is of a uniform size and shape such that each of the panels are suited for display on a targeted personal data assistant;

selecting from at least two inserts for a first panel for the web page based on the definition and the profile wherein a first insert of the at least two inserts for the first panel provides an advanced level of detailed information corresponding to a stock ticker symbol, and a second insert of the at least two inserts for the first panel provides a novice level of information for a stock ticker symbol, wherein a determination is made to display either the first insert or the second insert in the first panel, based on one factor selected from the following group of factors a user indicated preference as to whether the user wants advanced or novice level of information for the stock ticker symbol, and the user's previous usage pattern with a website;

providing at least a first insert and second insert for a second panel of the web page, wherein the first insert for the second panel is selected if the user is from a first geographic region, and the first insert includes content which is required by a first set of laws governing the first geographic region, and wherein the second insert for the second panel is selected if the user from a second geographic region, and the second insert includes content which is required by a second set of laws governing the second geographic region;

providing at least a first insert and a second insert for a third panel of the webpage, wherein the first insert for third panel includes secure data and is selected if the user has been authenticated, and the second insert for the third panel includes only non-secure data, and is selected if the user is not authenticated;

rendering the selected panels to produce code for the web page; and returning the code.

8. A data storage medium as recited in claim 7, wherein each panel is sized so that a series of panels may be simultaneously viewed on a standard sized computer display.

9. A data storage medium as recited in claim 7, wherein at least some of the inserts are user-specific.

* * * * *